(12) United States Patent
Barsness et al.

(10) Patent No.: US 7,779,024 B2
(45) Date of Patent: *Aug. 17, 2010

(54) USING ONTOLOGICAL RELATIONSHIPS IN A COMPUTER DATABASE

(75) Inventors: Eric Lawrence Barsness, Pine Island, MN (US); Randy William Ruhlow, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 225 days.

This patent is subject to a terminal disclaimer.

(21) Appl. No.: 12/039,421

(22) Filed: Feb. 28, 2008

(65) Prior Publication Data

US 2008/0162470 A1    Jul. 3, 2008

Related U.S. Application Data

(63) Continuation of application No. 11/138,836, filed on May 26, 2005, now Pat. No. 7,552,117.

(51) Int. Cl.
   *G06F 17/30* (2006.01)
(52) U.S. Cl. ............ 707/765; 707/796; 707/E17.063
(58) Field of Classification Search ............ None
   See application file for complete search history.

(56) References Cited

U.S. PATENT DOCUMENTS

| | | | |
|---|---|---|---|
| 5,732,258 A * | 3/1998 | Jakobsson et al. | 707/4 |
| 5,768,580 A | 6/1998 | Wical | |
| 6,038,560 A | 3/2000 | Wical | |
| 6,076,088 A | 6/2000 | Paik et al. | |
| 6,167,393 A | 12/2000 | Davis et al. | |
| 6,263,335 B1 | 7/2001 | Paik et al. | |
| 6,363,378 B1 * | 3/2002 | Conklin et al. | 1/1 |
| 6,438,533 B1 | 8/2002 | Spackman et al. | |
| 6,463,433 B1 * | 10/2002 | Baclawski | 707/5 |
| 6,480,857 B1 * | 11/2002 | Chandler | 707/100 |
| 6,640,231 B1 | 10/2003 | Andersen et al. | |
| 6,675,159 B1 | 1/2004 | Lin et al. | |
| 6,711,585 B1 | 3/2004 | Copperman et al. | |
| 6,728,692 B1 | 4/2004 | Martinka et al. | |
| 7,246,116 B2 * | 7/2007 | Barsness et al. | 707/3 |

(Continued)

FOREIGN PATENT DOCUMENTS

JP    2001084252 A   *   3/2001

OTHER PUBLICATIONS

Ron Turull, "Use the CHGQRYA command to help lessen interactive workloads", Jan. 22, 2003, TechTarget, iSeries Administrator Tips, pp. 1-2.*

*Primary Examiner*—Pierre M Vital
*Assistant Examiner*—Christopher P Nofal
(74) *Attorney, Agent, or Firm*—Martin & Associates, LLC; Bret J. Petersen

(57) ABSTRACT

An apparatus and method use ontological relationships in a query language and a computer database to improve database performance and utility. A set of ontological relationships are stored in the database and new query clauses are used to query the data in advantageous ways. Ontological relationships are preferably stored in a tree structure. This tree structure then can be used to reflect the ontological relationships of data stored in the columns of a database.

4 Claims, 7 Drawing Sheets

U.S. PATENT DOCUMENTS

| | | |
|---|---|---|
| 2002/0059289 A1 | 5/2002 | Wenegrat et al. |
| 2002/0107844 A1 | 8/2002 | Cha et al. |
| 2003/0101170 A1* | 5/2003 | Edelstein et al. ............... 707/3 |
| 2004/0002972 A1* | 1/2004 | Pather et al. ................... 707/6 |
| 2005/0216500 A1* | 9/2005 | Edelstein et al. ............ 707/102 |
| 2006/0036592 A1* | 2/2006 | Das et al. ....................... 707/4 |
| 2010/0049763 A1* | 2/2010 | Jung et al. .................. 707/721 |

* cited by examiner

| Predicate Expression | | | |
|---|---|---|---|
| Logical Expression | Relational Expression | Unary Expression | Boolean Expression |
| AND<br>OR<br>NOT<br>UNION | <<br>><br><=<br>>=<br>!= | isNull<br>isNotNull<br>exist<br>NotExist | TRUE<br>FALSE |

FIG. 2

Select * from Table1 where C1=4
AND (C2>6 OR C3!=8)

FIG. 3

C1=4 AND (C2>6 OR C3!=8)

FIG. 4

Table1 600

| Name | Disease | Blood Count |
|---|---|---|
| Paul | Non-Hodgkin's | low |
| Mary | Urothelial | low |
| Simon | Urothelial | low |
| Art | Urothelial | high |
| James | Cancer | low |
| Carly | Non-Hodgkin's | low |
| Fred | Non-Hodgkin's | low |
| Wilma | Lymphoma | |
| Barney | Lymphoma | |
| Chris | Adenocarcinoma | low |
| Jerry | Acute Myeloid | low |
| Norma | Squamous Cell | low |
| Jean | Squamous Cell | low |
| John | Acute Myeloid | high |
| Joe | Hodgkin's | high |
| Peter | Hodgkin's | high |
| Mathew | Myelogenous | high |
| Mark | Squamous Cell | high |
| Richard | Squamous Cell | high |
| Madad | Small Cell | low |
| Cindy | Leukemia | high |
| Peter | Bladder | low |
| Marsha | Hodgkin's | low |
| Jan | Multiple Sclerosis | low |
| Greg | Lymphocytic | low |
| David | Hodgkin's | high |
| Bradley | Bladder | high |
| Kevin | Acute Myeloid | low |
| Nicole | Small Cell | low |
| Emily | Small Cell | low |

FIG. 6

SELECT count(*) from TableT
where disease = "cancer"                    700

FIG. 7
(Prior Art)

SELECT count(*) from TableT                 800
where disease = "cancer"
Substitute Forward                          } 810

FIG. 8

SELECT count(*) from TableT                 900
where disease = "Lymphoma"
Substitute Forward 1 Level                  } 910

FIG. 9

SELECT count(*) from TableT                 1000
where disease = "Acute Myeloid"
Substitute Backward 1 Level                 } 1010

FIG. 10

```
SELECT disease, count(*) from TableT
where disease = "cancer"         ⎫
Group By disease                 ⎬ 1110
                                 ⎭
```
1100

| Disease | Count |
|---|---|
| Non-Hodgkin's | 3 |
| Hodgkin's | 4 |
| Urothelial | 3 |
| Cancer | 1 |
| Lymphoma | 2 |
| Adenocarcinoma | 1 |
| Acute Myeloid | 3 |
| Squamous Cell | 4 |
| Myelogenous | 1 |
| Small Cell | 3 |
| Leukemia | 1 |
| Bladder | 2 |
| Lymphocytic | 1 |
| Multiple Sclerosis | 1 |

```
SELECT disease, count(*) from TableT
where disease = "cancer"              ⎫
Group By disease At Level 2           ⎬ 1310
                                      ⎭
```

| Disease | Count |
|---|---|
| Cancer | 29 |
| Central Nervous System | 1 |

FIG. 14

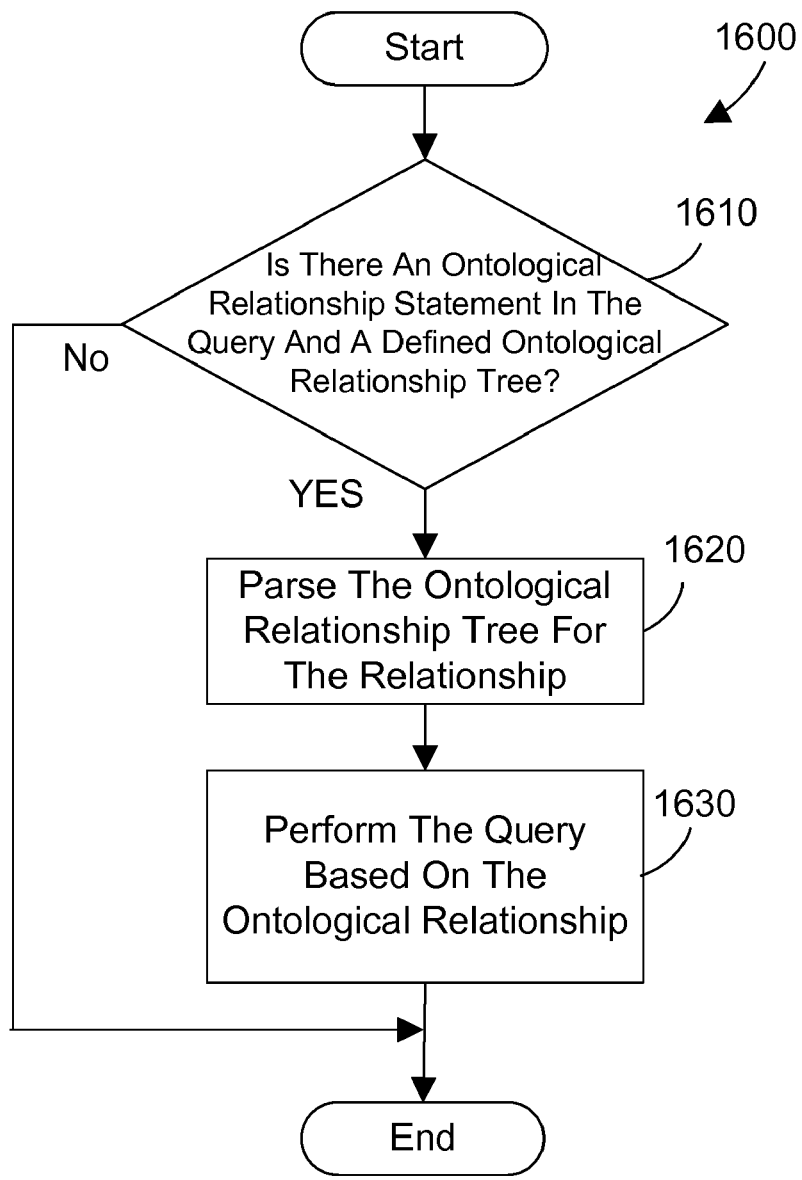

USING ONTOLOGICAL RELATIONSHIPS IN A COMPUTER DATABASE

CROSS-REFERENCE TO PARENT APPLICATION

This patent application is a continuation of U.S. Ser. No. 11/138,836 now U.S. Pat. No. 7,552,117, titled "USING ONTOLOGICAL RELATIONSHIPS IN A COMPUTER DATABASE", and filed on May 26, 2005, which is incorporated herein by reference.

BACKGROUND OF THE INVENTION

1. Technical Field

This invention generally relates to computer systems, and more specifically relates to apparatus and methods for improving access to data in a computer database by incorporating ontological relationships in a query language and a computer database.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Data is typically stored in database tables. The tables contain columns and rows of data. The data in the table is related to or associated with other data in corresponding columns and rows. For the example described for insurance companies, the rows of the database may be associated with the name of policy holders, while the columns would be for different pieces of data such as policy number and policy type. In prior art databases, relationships of the data are stored in indexes.

Retrieval of information from a database is typically done using queries. A database query typically includes one or more predicate expressions interconnected with logical operators. A predicate expression is a general term given to an expression using one of the four kinds of operators (or their combinations): logical, relational, unary, and boolean, as shown in FIG. 2. A query usually specifies conditions that apply to one or more columns of the database, and may specify relatively complex logical operations on multiple columns. The database is searched for records that satisfy the query, and those records are returned as the query result.

Data stored in a typical database may include ontological relationships. For use in this specification and claims, an ontological relationship is defined as the hierarchical structuring of knowledge about data by sub categorizing data items according to their essential, relevant or cognitive qualities. Prior art databases do not capitalize on these ontological relationships of data stored in the database.

The data stored in prior art indexes and used to query the database do not store and use ontological relationship information. Information that is stored in one column may be related to information stored in another column, but the difficulty in maintaining these relationships has limited their use. This lack of storing and using ontological relationships of the data limits the database's utility and efficiency. Without a way to capitalize on ontological relationships of data, the full potential of the computer industry to continue to improve efficiency of database performance will be limited.

DISCLOSURE OF INVENTION

In accordance with the preferred embodiments, an apparatus and method use ontological relationships in a query language and a computer database to improve database performance and utility. In preferred embodiments, a set of ontological relationships are stored in the database and new query clauses are used to query the data in advantageous ways. In a preferred embodiment, ontological relationships are stored in a tree structure. This tree structure then can be used to reflect the ontological relationships of data stored in the columns of a database according to other preferred embodiments.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 2 is a table showing expressions that may be included in a predicate expression in a database query;

FIG. 3 is a sample database query in Structured Query Language (SQL);

FIG. 4 is a predicate expression that is representative of the WHERE clause in the sample database query of FIG. 2;

FIG. 6 is a sample database table that can be used in association with the ontological relationships shown in FIG. 5 according to preferred embodiments;

FIG. 7 is a query statement to operate on the table in FIG. 6 according to the prior art;

FIG. 8 is a query statement with an ontological clause according to a preferred embodiment;

FIG. 9 is a query statement with an ontological clause according to another preferred embodiment;

FIG. 10 is a query statement with an ontological clause according to another preferred embodiment;

FIG. 11 is another query statement to operate on the table in FIG. 6 according to the prior art;

FIG. 12 shows the result set for the query shown in FIG. 11 according to the prior art;

FIG. 13 is a query statement with a Group At Level ontological clause according to another preferred embodiment;

FIG. 14 shows the result set for the query shown in FIG. 13 according to a preferred embodiment;

FIG. 15 shows a query with a Change Query Attributes clause according to a preferred embodiment; and FIG. 16 is a flow diagram illustrating a method according to the preferred embodiments.

BEST MODE FOR CARRYING OUT THE INVENTION

1.0 Overview

The present invention relates to incorporating ontological relationships into databases and database queries such as queries in Structured Query Language (SQL). For those not familiar with databases or queries, this Overview section provides background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, let's assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

One popular way to define a query uses Structured Query Language (SQL). SQL defines a syntax for generating and processing queries that is independent of the actual structure and format of the database. One sample SQL query is shown in FIG. 3. The SELECT statement tells the database query processor to SELECT all columns, the "from Table1" clause identifies which database table to search, and the WHERE clause specifies one or more expressions that must be satisfied for a record to be retrieved. Note that the query of FIG. 3 is expressed in terms of columns C1, C2 and C3. Information about the internal storage of the data is not required as long as the query is written in terms of expressions that relate to values in columns from tables.

For the query of FIG. 3, the WHERE clause specifies that the first column has a value equal to four (C1=4) logically ANDed with the expression that the second column is greater than six OR the third column is not equal to eight. The expression in the WHERE clause of FIG. 3 is shown in FIG. 4. Where not specifically stated herein, the term "expression" is intended to mean an arbitrary predicate expression, which can be an entire expression in a query, a portion of an expression in a query, or the entire query and may include logical expressions, relational expressions, unary expressions, boolean expressions, and their combinations.

2.0 Detailed Description

Figure 1:
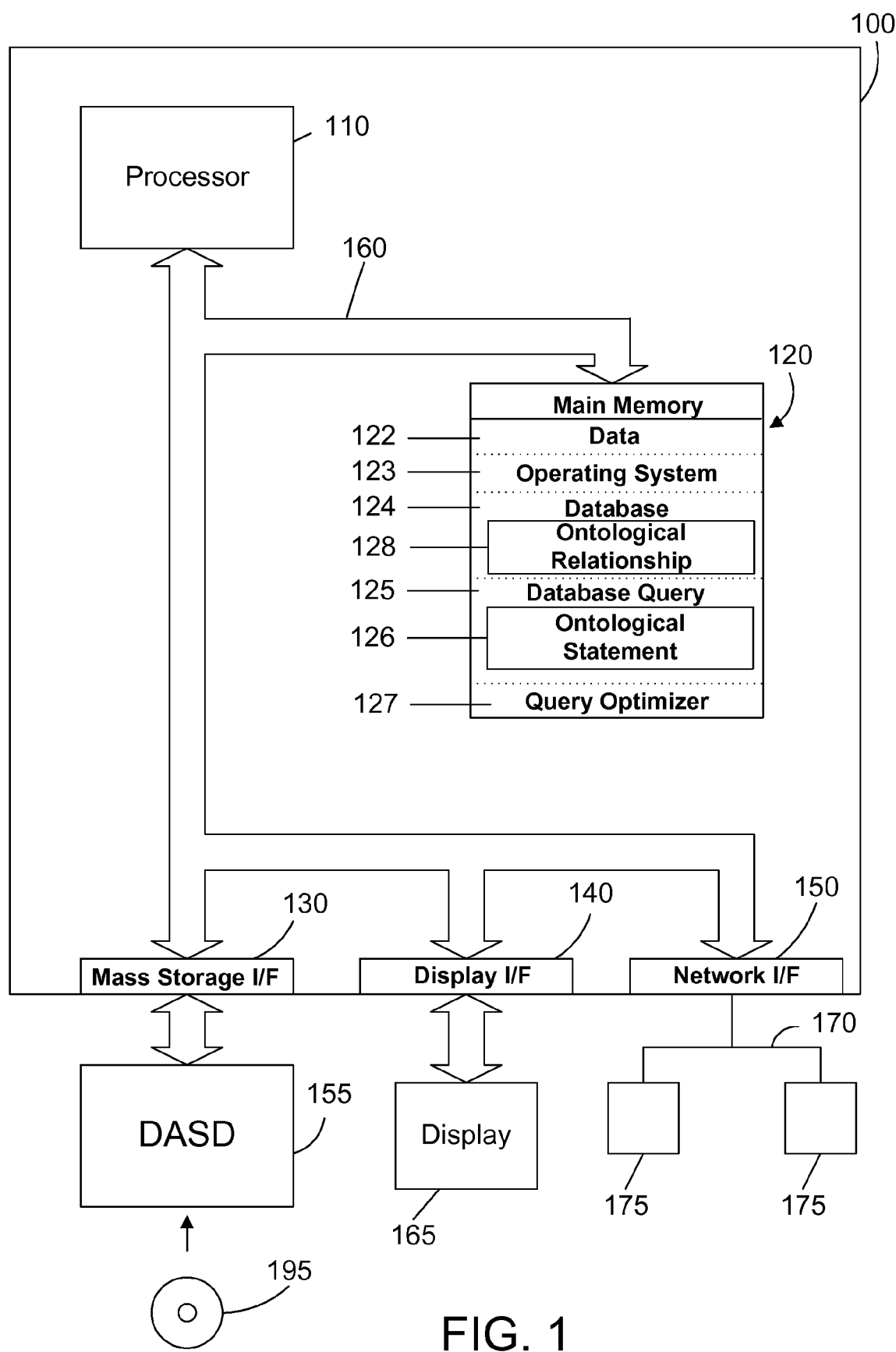
FIG. 1 is an apparatus in accordance with the preferred embodiments.

Referring now to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD RW drive, which may store data to and read data from a CD RW 195.

Main memory 120 in accordance with the preferred embodiments contains data 122, an operating system 123, a database 124, one or more database queries 125, and a database query optimizer 127. Data 122 represents any data that serves as input to or output from any program in computer system 100. Operating system 123 is a multitasking operating system known in the industry as i5/OS; however, those skilled in the art will appreciate that the spirit and scope of the present invention is not limited to any one operating system. Database 124 is any suitable database, whether currently known or developed in the future. Database query 125 is a query in a format compatible with the database 124 that allows information stored in the database 124 that satisfies the database query 125 to be retrieved. Database query 125 includes a new ontological query clause 126 for accessing an ontological relationship 128 in accordance with the preferred embodiments. Query optimizer 127 optimizes a query 125 and produces an access plan used by a database manager in the database 124 to access the database.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 123, database 124, database query 125, and the database query optimizer 127 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 123. Operating system 123 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD RW (e.g., 195 of FIG. 1), and transmission type media such as digital and analog communications links.

Figure 5:
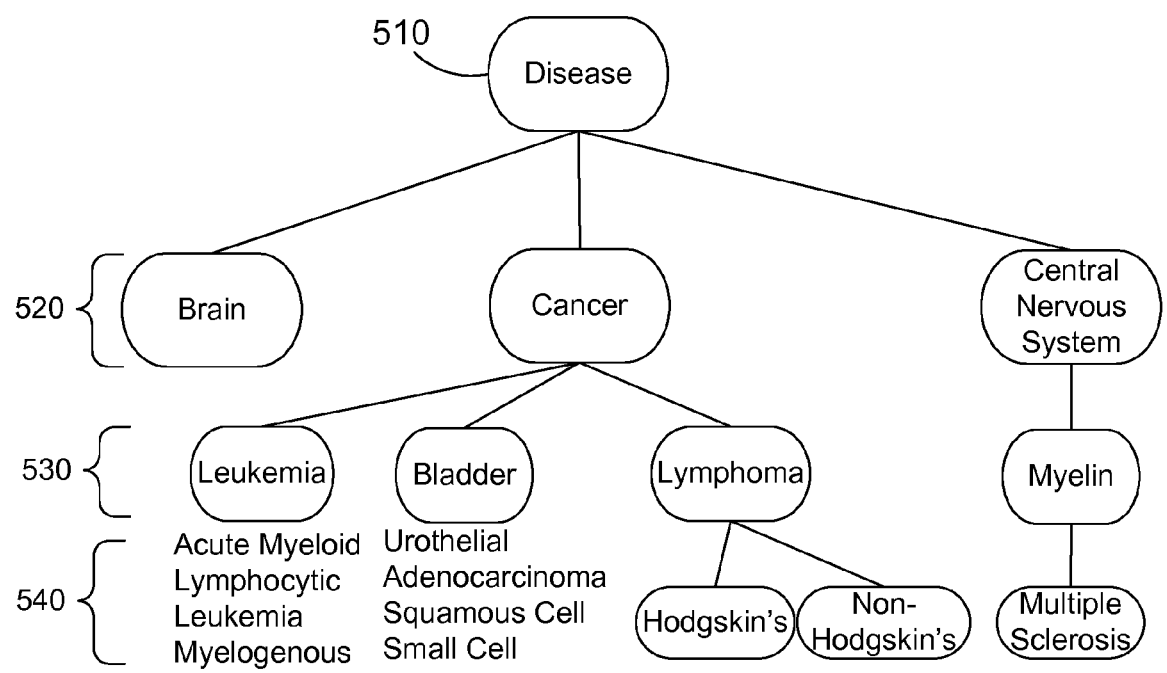
FIG. 5 is an example of a set of ontological relationships that can be stored in a database and used in a query according to preferred embodiments.

Referring now to FIG. 5, a tree diagram shows an example set of ontological relationships that can be stored in a database and used in a query in accordance with preferred embodiments. In this example, the ontological relationships are organized in a tree structure, however other data structures could also be used. The top of the tree is the first level of the data structure. In this example the first level is the broad category of "disease" 510. Under this first level is a second level 520 that has some different types of diseases and/or parts of the body, i.e. brain, cancer and central nervous system. A third level 530 under "cancer" list three types of cancer, including leukemia, bladder, and lymphoma. A fourth level 540 under leukemia includes acute myeloid, lymphocytic, leukemia, and myelogenous. Similarly, other relationships at the various levels are illustrated in FIG. 5.

The system may maintain the ontological relationships as illustrated in FIG. 5 using any appropriate data structure. For example, the ontological relationships could be stored as linked lists or an indexing structure to allow the computer system to retrieve information in the manner shown in FIG. 5 and described herein.

FIG. 6 shows a database table 600 that holds data for the example ontological relationships table shown in FIG. 5 and used for illustration of the preferred embodiments described below. The table 600 is called 'Table1' and has the following columns: 'Name', "Disease" and 'Blood Count'. Each row of the columns is a record for a patient and thus has associated data for the patient name in the corresponding row. The table shown is highly simplified for illustration, and it is recognized that other data could similarly be associated with each patient. Further the claims are not limited to the example of health care and diseases.

FIG. 7 shows an example of a query used to operate on Table 1 according to the prior art. This query returns as a result the count of the number of patients with the disease of "cancer." When the query as shown in FIG. 7 is executed for the table 600 according to the prior art, the query returns a result of "1". This result is consistent with the data of Table1 that has a single record with the disease of cancer with the patient name of "James."

In contrast to the query described above with reference to FIG. 7, FIG. 8 shows an example of a query used to operate on Table 1 that includes an ontological clause 810 according to preferred embodiments. Query 800 is also an illustrative example of a database query 125 that resides in main memory 120 shown in FIG. 1. Query 800 returns as a result the count of the number of patients with the disease of "cancer" while including the "Substitute Forward" 810 query clause. When query 800 shown in FIG. 8 is executed with the data of Table1 600 according to the preferred embodiments, the query returns a result of "29". This result is returned since the data of Table1 has a total of 30 records and a single record where the disease associated with the patient name falls outside the tree forward from the position of "cancer." In the data of Table1, only the patient name of "Jan" has a disease that is not forward from the disease of cancer according to the ontological relationship tree in FIG. 5. This means that each of the other patients have an associated disease that is either cancer, or a disease listed in a level of the tree below the level of cancer. Note that the Substitute Forward clause in the query does not specify how many levels to look forward. In the described embodiment, where the level is not specified, all levels forward are returned.

Referring now to FIG. 9, another query 900 is shown for another example of how the query will be analyzed and executed in accordance with preferred embodiments. Query 900 has a SELECT statement with a Substitute Forward clause 910. Query 900 returns as a result the count of the number of patients with the disease of "Lymphoma" while including the "Substitute Forward 1 Level" clause 910. When query 900 shown in FIG. 9 is executed with the data of Table1 600 according to the preferred embodiments, the query returns a result of "6". This result is returned since the data of Table1 has 6 records where the disease associated with the patient name falls forward 1 level from the position of "Lymphoma." Note that the "Substitute Forward 1" clause 910 in the SQL query 900 specifies a specific number of how many levels to look forward.

Referring now to FIG. 10, another query 1000 is shown for another example of how the query will be analyzed and executed in accordance with preferred embodiments. Query 1000 has a SELECT statement with a Substitute Backward clause 1010. Query 1000 returns as a result the count of the number of patients with the disease of "Acute Myeloid" while including the "Substitute Backward 1 Level" clause 1010. When query 1000 shown in FIG. 10 is executed with the data of Table1 600 according to the preferred embodiments, the query returns a result of "4". This result is returned since the data of Table1 that has 4 records where the disease associated with the patient name falls backward 1 level from the position of "Acute Myeloid." These records are those with the names: Jerry, John, Matthew, and Greg. Note that the "Substitute Backward 1 Level" clause 1010 in the query 1000 specifies a specific number of how many levels to look backward.

Referring now to FIG. 11, another query 1100 is shown for another example of how the query will be analyzed and executed in accordance with the prior art. Query 1100 has a SELECT statement with a Group By clause 1110. When query 1100 shown in FIG. 11 is executed with the data of Table1 600 according to the prior art, the query returns a result as shown in FIG. 12. This result shows a table with the count of records grouped by disease.

In contrast to the query described above with reference to FIG. 11, FIG. 13 shows another example of a query used to operate on Table 1 according to preferred embodiments. Query 1300 returns as a result the count of the number of patients grouped by disease while including the "Group By disease At Level 2" clause 1310. When query 1300 shown in FIG. 13 is executed with the data of Table1 600 according to the preferred embodiments, the query returns a result set as shown in FIG. 14. This result set 1400 shows the total of records for each disease "Cancer" and "Central Nervous System" since these are the diseases located at level 2 in the ontological tree 500 (shown in FIG. 5). In Table1 there is a single record where the disease associated with the patient name falls "Central Nervous System" while the remainder of the records fall in the disease of "Cancer." Note that the Group By At Level clause 1310 in the query 1300 specifies which level for the Group By At Level clause to operate on.

The embodiments described above store ontological relationships in a database and allow using ontological clauses in a query using the newly introduced clauses of Substitute Forward, Substitute Backward, and Group By At Level N. It would be readily apparent to those of ordinary skill in the art that other clauses could be produced to provide a similar result with the described embodiments and within the claimed invention. Further, the same result could be achieved using a Change Query Attribute (CHGQRYA) clause prior to a query with the same syntax as the prior art query. A CHGQRYA allows a subsequent SQL query statement to run with different attributes depending on the options selected by the CHGQRYA clause.

FIG. 15 shows an example query 1500 with a CHGQRYA clause 1510 that instructs the database to Group By disease At Level 2. The subsequent query 1520 would then operate as described in the above example, where a Group By clause was included in an query. Thus, the syntax for the CHGQRYA clause could be as shown in the above examples, except the ontological clause may appear at the beginning of the query statement rather than in the query as shown.

Referring now to FIG. 16, method 1600 is illustrated for evaluating a query that includes a Substitute Forward clause in accordance with the preferred embodiments. Method 1600 first determines if there is an ontological clause in the query and a corresponding ontological relationship tree exists in the database (step 1610). If there is no ontological clause in the query or no corresponding ontological relationship tree exists in the database (step 1610=no) the method is done. If there is an ontological clause in the query and a corresponding ontological relationship tree exists in the database (step 1610=yes) then the method proceeds to parse the ontological relationship tree for the relationship in the ontological query clause (step 1620). The ontological query is then performed on the database based on the ontological relationship (step 1630).

The present invention as described with reference to the preferred embodiments provides significant improvements over the prior art. The present invention provides a way to reduce database query time to improve system performance, and reduce excessive delays in database accesses.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
  at least one processor;
  a memory coupled to the at least one processor; and
  a database residing in the memory having data, wherein the apparatus is configured to:
    receive a database query;
    analyze the database query to determine whether the database query satisfies a first condition, the first condition being satisfied if the database query comprises a SELECT statement and an ontological clause in the form of a Change Query Attribute (CHGQRYA) clause, wherein the CHGQRYA clause is composed of a Substitute Forward clause, Substitute Backward clause, or a Group By At Level clause;
    analyze the database to determine whether the database satisfies a second condition, the second condition being satisfied if the database defines an ontological data structure for the CHGQRYA clause; and
    when the first condition and the second condition are satisfied:
      parsing the ontological data structure to extract an ontological relationship for the CHGQRYA clause;
      using the extracted ontological relationship to modify an attribute of the database query; and
      executing the database query to return data from the database, wherein the data is associated with the ontological relationship.

2. The apparatus of claim 1 wherein the ontological data structure is organized in the shape of a tree.

3. An article of manufacture comprising:
  (A) a database manager that:
    determines whether a database query satisfies a first condition, the first condition being satisfied if the database query comprises a SELECT statement and an ontological clause in the form of a Change Query Attribute (CHGQRYA) clause, wherein the CHGQRYA clause is composed of a Substitute Forward clause, Substitute Backward clause, or a Group By At Level clause;
    analyzes the database to determine whether the database satisfies a second condition, the second condition being satisfied if the database defines an ontological data structure for the CHGQRYA clause; and
    when the first condition and the second condition are satisfied:
      parsing the ontological data structure to extract an ontological relationship for the CHGQRYA clause;
      using the extracted ontological relationship to modify an attribute of the database query; and
      executing the database query to return data from the database, wherein the data is associated with the ontological relationship; and
  (B) computer-recordable media bearing the database manager.

4. The apparatus of claim 3 wherein the ontological data structure is organized in the shape of a tree.

* * * * *